Figure 1:
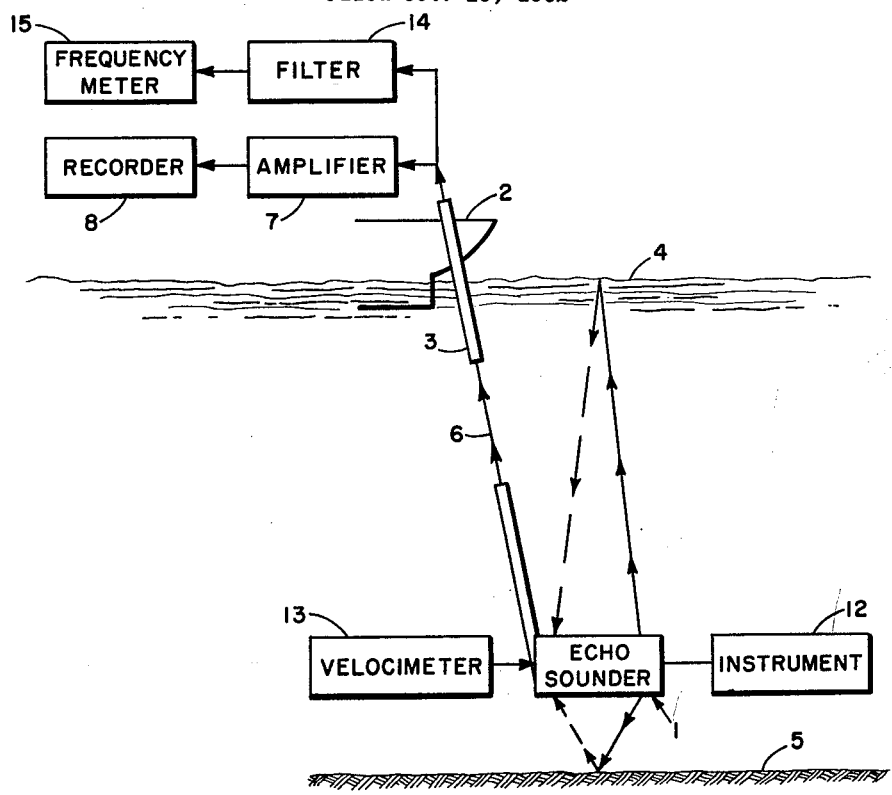

March 16, 1965 W. DOW ETAL 3,174,128

COMBINED DEPTH MONITORING AND SEISMIC SURVEYING APPARATUS

Filed Oct. 15, 1962

Willard Dow
Stephen L. Stillman, Jr.
INVENTORS

BY *M. Throgo*
Attorney

United States Patent Office 3,174,128
Patented Mar. 16, 1965

3,174,128
COMBINED DEPTH MONITORING AND SEISMIC SURVEYING APPARATUS
Willard Dow, North Falmouth, and Stephen L. Stillman, Jr., Falmouth, Mass., assignors to the United States of America as represented by the Secretary of the Navy
Filed Oct. 15, 1962, Ser. No. 230,769
4 Claims. (Cl. 340—3)

The present invention relates generally to oceanographic apparatus and more particularly to a combined precision depth meter and bottom survey instrument.

Oceanographic instruments are now available which are capable of measuring, for example, sound velocity, temperature and salinity to a high degree of precision. However, the value of these measurements is greatly reduced if the depth of the instrument is not also known simultaneously and with comparable accuracy.

Most devices for depth measurement utilize, for example, bellows or Bourdon tubes as their sensing components. Although these elements can be made sensitive to small pressure changes in shallow water, unfortunately, they become stiff and insensitive to equivalent changes when they are designed to withstand the high static pressures encountered at deep ocean levels.

It is accordingly a primary object of the present invention to provide a continuous and precise measurement of the depth of an instrument being lowered into deep ocean levels.

Another object of the present invention is to provide a combined precision depth meter and bottom survey instrument.

A still further object of the present invention is to provide depth measuring apparatus capable of indicating simultaneously the distance from the surface and from the bottom when within approximately 100 fathoms of the bottom.

A yet still further object of the present invention is to enhance the accuracy of a depth meter which utilizes the velocity of sound in the fluid medium of the unit of measurement.

A still further object of the present invention is to provide a depth meter which can be utilized in an alternative mode of operation to give a highly detailed profile of the ocean bottom.

Briefly and in somewhat general terms, the above objects of invention are achieved, according to one preferred embodiment, by utilizing an inverted echo ranging unit as the depth determining apparatus. This sonar unit is orientated so that its main lobe always points towards the water surface. When triggered, it therefore radiates a short pulse of sonic energy towards the surface. The reflected pulses are thereafter detected by the sonar set operating in its receiving mode. Both the trigger pulses and the detected reflected pulses are transmitted over a suitable electrical conductor incorporated into the cable suspending the sonar set from the surface and applied to a conventional graphic recorder. This recorder and the deep sonar unit are both equipped with precision time bases of great stability, so that once both are synchronized to a common accurate source, they will remain in step for very long periods of time. Since the round-trip travel time of each pulse is available at the recorder, the depth of the apparatus at any one time can be directly determined.

The present invention takes advantage of the fact that most sounders not only have a major lobe but a minor lobe in an opposite direction thereto. Consequently, each time the echo sounder is activated, a weaker sound signal is also radiated towards the ocean bottom. It is this weaker signal which is employed in one modification to provide an indication of the height of the gear above the bottom. The reflected bottom signals are also detected during the receiving portion of the cycle and sent to the recorder along with the reflected surface signals. When the bottom profile appears on the recording chart, it can be monitored to indicate when the lowering operation should be terminated to avoid driving the instrument package into the ocean bottom.

The back lobe may also be used in bottom survey operations. To accomplish this, the echo sounder need only be lowered, for example, to thirty feet from the bottom and towed slowly across the region of interest. Under these conditions, the area covered by the radiated beam at any one moment will be comparatively small and details of the bottom structure can be observed without the ambiguity produced by side reflections or the losses encountered in sound transmissions through thousands of feet of water. Moreover, since the sea surface is constantly being recorded, the depth of these bottom features can also be ascertained from an inspection of the recorded chart.

It will be appreciated that the accuracy of depth measurements made in accordance with the method just described depends fundamentally upon the accuracy with which the velocity of sound throughout the lowering site is known. This velocity varies, of course, with water temperature, density and salinity. Consequently, the more accurate these factors are known, the more precise the depth measurement since the resolving power of the echo sounder is sufficient to indicate vertical changes of a few feet regardless of its depth. Hence, in one embodiment of the invention, a sound velocimeter is lowered along with the echo sounder. Since velocity information is not complete without a precise depth measurement and since the depth measurement becomes far more accurate when the true velocity is known, these two instruments complement each other and improve the over-all precision of the system.

Figure 2:
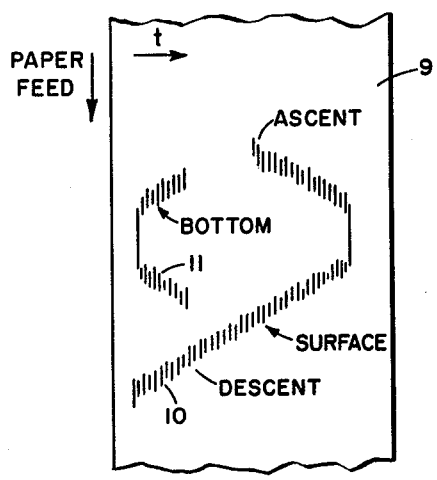

Other objects, advantages and novel features of the invention will become apparent from the following detailed description of the invention when considered in conjunction with the accompanying drawings wherein:

FIG. 1 is a schematic diagram of a preferred embodiment of the present invention; and FIG. 2 is a strip of recording paper from the recorder of FIG. 1 showing a typical lowering operation.

Referring now to FIG. 1 of the drawings, the depth measuring apparatus, according to one preferred embodiment of the invention, comprises an echo sounder 1 adapted to be lowered from amidships of a surface vessel 2 by means of a suitable logging cable 3. This cable serves both as the supporting means for all of the oceanographic gear and as the signal transmission link between this gear and the surface. As mentioned hereinbefore, echo sounder 1 is maintained and stabilized in an inverted position with its main lobe directed perpendicular to the water surface 4 and its minor lobe similarly orientated with respect to the bottom 5. Consequently, when this apparatus is periodically triggered, a high intensity sound pulse is radiated towards the surface and a low intensity pulse is simultaneously radiated towards the bottom. Each trigger pulse is transmitted directly to the surface via conductor 6 of cable 3 and, after amplification in amplifier 7, sent to graphic recorder 8. This recorder may be of the type wherein a rotating helical conductor serves as the timing element and the recording is accomplished by an electrical discharge created by the input signal between a predetermined point therealong and a spaced parallel metallic bar between which elements the recording paper passes at a uniform speed.

The high and low intensity sound pulses emitted by echo sounder 1 are reflected by the water and bottom surfaces, respectively, and thereafter detected by the sounder operating in a receiving mode. Both of these detected signals are likewise transmitted over conductor 6 to amplifier 7 and recorder 8.

The operation of the system of FIG. 1 can, perhaps, best be understood by referring now to FIG. 2 which depicts a record made by recorder 8 during one lowering and raising operation. Recording strip 9, it will be seen, contains a trace 10 with positive slope proportional to echo sounder lowering speed, representing the descent of the apparatus to a predetermined depth. Since the apparatus approaches the bottom at the same rate it leaves the surface, the recording strip also contains a second trace 11 having a negative slope equal to that of trace 10. By studying this recording, the depth of the instrument package and its height above the bottom can be readily determined at any given time. Moreover, by observing the manner in which trace 11 approaches the left-hand edge of the recording paper, one may monitor the instrument's approach to the bottom and determine at which point its lowering should terminate so as to prevent possible damage to the equipment.

The particular instrument or instrument package whose depth is being monitored may be simply connected to the sonar equipment, as graphically depicted in FIG. 1, by rectangular box 12.

Since the depth measuring apparatus utilizes the velocity of sound as its measuring unit, it is desirable to know the value of this velocity throughout the lowering region. Thus, as mentioned hereinbefore, the system includes a sound velocimeter 13 which is adapted to be lowered along the sonar set.

The sound velocimeter used in the system of the present invention can be of the "sing around" type. Essentially, this meter, as is well known, comprises a pulse generator whose pulse repetition rate is determined by the transit time of a pulse of sound energy between two transducers separated by a fixed distance L in the fluid in which speed of sound propagation is to be measured. More particularly, the apparatus includes a pulse generator coupled to one of these transducers and an amplifier coupled to the other with the output of the amplifier retriggering the pulse generator. By measuring the pulse repetition rate of the generator and knowing the distance L, the sound velocity can be solved from the expression $$f = \frac{C}{L}$$

The output signals of the pulse generator are amplified by a separate power stage within the echo sounder package and then combined with the depth signal for transmission to the surface via conductor 6 to filter 14. This filter separates the velocity signals from the depth data signals and feeds them to a suitable frequency meter 15.

The apparatus of the present invention, as mentioned hereinbefore, can also be used to carry out bottom surveys. All that is necessary in this regard is for the equipment to be lowered near to the bottom and towed across the region of interest. Since the sound source is close to the bottom, a minimum amount of beam spreading occurs. Hence, fine details of this surface can be observed. The depth of these subterranean structures can be ascertained from the surface and bottom profiles available on the recording strip of FIG. 2.

Obviously many modifications and variations of the present invention are possible in the light of the above teachings. It is therefore to be understood that within the scope of the appended claims the invention may be practiced otherwise than as specifically described.

What is claimed is:

1. Apparatus for determining the depth of an instrument in a fluid medium having an upper and lower boundary surface comprising a sonic transducer coupled to said instrument, said sonic transducer when activated radiating simultaneously first and second sound pulses in opposite directions and being capable of detecting sound pulses arriving from said opposite directions, said sonic transducer being orientated such that said directions are perpendicular to said upper and lower boundary surfaces, means for periodically activating said transducer, a recorder synchronized with said means for periodically activating said sonic transducer and means for transmitting echo pulses detected by said sonic transducer after reflection from said upper and lower boundary surfaces to said recorder thereby to provide an indication of the location of said instrument with respect to said upper and lower boundary surfaces.

2. In a method for monitoring at a remote location the position of an instrument being lowered into a fluid medium having an upper and lower boundary surface, the steps of attaching a sound transducer of the type that radiates simultaneously a pulse of sound energy in a first and opposite direction when activated and is capable of detecting pulses of sound energy arriving from said first and opposite directions to said instrument, lowering said instrument into said fluid medium with said sound transducer orientated such that said first direction is perpendicular to the top upper boundary surface of said fluid medium, periodically activating said sound transducer at known times and recording at said remote location the time of activation of said sound transducer and the time of arrival of corresponding echo pulses arriving at said sonic transducer after reflection from the upper and lower boundary surfaces of said fluid medium.

3. In a seismic surveying method for investigating subterranean structures, the steps of lowering a sonic transducer of the type which when activated radiates a first pulse in one direction and concurrently therewith a second pulse in an opposite direction and is capable of detecting pulses arriving at said sonic transducer arriving from said one and opposite directions to a location near the ocean bottom, orientating said sonic transducer such that said directions are perpendicular to the ocean surface and the ocean bottom, periodically activating said sonic transducer and recording the time of activation of said sonic transducer and the time of arrival of echo pulses subsequently detected by said sonic transducer after reflection from said ocean surface and said ocean bottom.

4. Apparatus for indicating at a remote location the position of an instrument being lowered into the sea comprising a sonic transducer, said transducer being of the type that radiates simultaneously sound energy in opposite directions when activated and subsequently is capable of detecting sound energy arriving from said opposite directions, means for coupling said sonic transducer to said instrument with said sonic transducer orientated such that the direction of the sound energy radiated therefrom is perpendicular to the sea surface, means for periodically activating said sonic transducer thereby to radiate sound pulses and means at said remote location for recording the time of radiation of said sound pulses and the time of detection of said sound pulses after their reflection from the sea surface and from the bottom of said sea.

References Cited by the Examiner

UNITED STATES PATENTS

| | | | |
|---|---|---|---|
| 2,480,561 | 8/49 | Ewing et al. | 340—3 |
| 2,623,116 | 12/52 | Rymes | 346—23 |
| 2,756,404 | 7/56 | Anderson et al. | 340—3 X |
| 2,853,824 | 9/58 | Schutz et al. | 340—3 X |

OTHER REFERENCES

"Uses of Sonar in Oceanography," by H. E. Edgerton, Electronics, vol. 33, June 24, 1960, pages 93–95 relied on.

CHESTER L. JUSTUS, *Primary Examiner.*